(12) United States Patent
Chisolm

(10) Patent No.: US 6,764,177 B1
(45) Date of Patent: Jul. 20, 2004

(54) EYEGLASS RETAINER

(75) Inventor: Gregg Chisolm, Salt Lake City, UT (US)

(73) Assignee: Chisco, Inc., Salt Lake City, UT (US)

( * ) Notice: Subject to any disclaimer, the term of this patent is extended or adjusted under 35 U.S.C. 154(b) by 0 days.

(21) Appl. No.: 10/360,069

(22) Filed: Feb. 6, 2003

(51) Int. Cl.⁷ .................................................. G02C 3/00
(52) U.S. Cl. .................................... 351/157; 351/156
(58) Field of Search ............................. 351/156, 157, 351/158, 140, 41

(56) References Cited

U.S. PATENT DOCUMENTS

| | | |
|---|---|---|
| 1,819,738 A | 8/1931 | Daniels |
| 2,481,946 A | 9/1949 | Pendleton |
| 2,539,922 A | 1/1951 | Nyberg |
| 2,704,961 A * | 3/1955 | Weil ........................... 351/156 |
| 4,696,556 A | 9/1987 | Perry, III |
| D309,619 S | 7/1990 | Kalbach |
| D328,908 S | 8/1992 | Kalbach |

FOREIGN PATENT DOCUMENTS

EP        0 058 772        9/1982

OTHER PUBLICATIONS

CROAKIES—Tite End™ eyewear retainers.
CHUMS—adjustable eyewear retainer.
EK USA—3 Way eyewear retainer.

* cited by examiner

*Primary Examiner*—Hung Xuan Dang
(74) *Attorney, Agent, or Firm*—Morris O'Bryant Compagni, P.C.

(57) ABSTRACT

An eyeglass retainer is disclosed which comprises a filament member having gripping members connected at either end of the filament member, the gripping members being structured for securement to the terminal end of earpieces for eyeglasses. Each gripping member is structured with a plurality of openings through which the terminal end of eyeglasses may be positioned to provide a variety of ways that the retainer may be attached to the glasses. The eyeglass retainer may further include one or more contact members for contacting and engaging a portion of the glasses to facilitate attachment of the eyeglass retainer to the glasses.

13 Claims, 5 Drawing Sheets

EYEGLASS RETAINER

BACKGROUND OF THE INVENTION

1. Field of the Invention

This invention relates to devices for attachment to the earpieces of eyeglasses to enable the suspension of the eyeglasses from around the neck, and specifically relates to such a device that provides the user a variety of means for attaching the eyeglasses to the device.

2. Description of Related Art

Devices for retaining a pair of eyeglasses around the neck have been known for many decades. Early devices comprised a length of metal chain at either end of which was connected a metal or fabric loop sized to receive the terminal end of the earpieces of a pair of eyeglasses. In more recent decades, such devices were improved to comprise a length of fabric having an eyeglass retaining member positioned at either end.

One common group of retainer devices comprises a length of tubular fabric. Either end of the tubular fabric is open to provide a point for inserting the end of a pair of eyeglasses. Such devices often include an adjustment member through which the length of fabric is threaded. The adjustment member may be slid along the length of the tubular fabric to tighten the glasses against the face. Other known devices comprise a length of woven cord at either end of which is an attached retainer member into which the end of a pair of glasses may be inserted. Some retainer members comprise a simple loop of fabric. Other retainer members comprise a tubular piece of elastomer material providing an open end into which the end of the earpieces of the glasses may be positioned.

All known retainer devices provide means for retaining a pair of glasses around the neck of the user or retain the glasses more securely on the wearer's face. However, known retainer devices provide only a single means of attaching the glasses to the device and a wearer must either find that means of attachment comfortable for use or forego the use of a retainer device.

Therefore, it would be advantageous in the art to provide an eyeglass retainer device that has retaining members which are structured to provide a variety of means by which a pair of glasses may be retained by the device, thereby being suitable to the varied preferences of consumers.

BRIEF SUMMARY OF THE INVENTION

In accordance with the present invention, an eyeglass retainer is structured to provide a variety of means by which a user may attach a pair of glasses to the retaining device. The present invention is also structured to provide securement members to improve the retaining capacity of the eyeglass retainer on glasses. As used herein, the term "eyeglasses" is meant to include glasses used for correcting vision as well as sunglasses and any other type or form of eye covering that has a frame including a pair of earpieces for positioning on the ears of the wearer to help support the frame on the head.

The present invention generally comprises a filament member having a first end and a second end. A first gripping member is attached to the first end of the filament member and a second gripping member is attached to the second end of the filament member. The first and second gripping members are structured with a plurality of openings that enable the terminal end of the earpiece of a pair of glasses to be inserted into or through the gripping member to attach the eyeglass retainer device to a pair of glasses.

The filament material of the present invention may be made of any suitable material, including metals, fabrics, woven or non-woven cord, plastics or elastomers. The filament material may be sized in any appropriate dimensional length to accommodate an individual's needs or preference. For example, eyeglass retainer devices for children or babies may be structured with a filament member that is shorter than that anticipated for an adult.

The first and second gripping members of the present invention are structured with a plurality of openings through which the terminal end of an eyeglass earpiece may be positioned. Each gripping member is generally tubular and each has a first end and a second end. The first end is structured to be received on one terminal end of the filament member. The second end is structured with an opening into which the terminal end of an eyeglass earpiece may be positioned. At least one additional opening is provided in each gripping member through which the earpiece of the eyeglasses may be positioned. In a particularly suitable embodiment, a pair of openings is provided in transverse orientation to the opening in the end of each gripping member.

The pair of openings and the opening in the end of each gripping member provide, in varying combination, a plurality of arrangements by which and earpiece of the glasses may be connected to the gripping member. The user may thereby select an attachment arrangement that is most suitable to his preference.

The gripping members of the present invention may further be configured with at least one contact member which is positioned within the gripping member in proximity to one or more of the openings in the gripping member to contact and engage a portion of the earpiece of the glasses positioned through the opening or openings to improve retention of the earpiece within the gripping member.

BRIEF DESCRIPTION OF THE SEVERAL VIEWS OF THE DRAWINGS

In the drawings, which illustrate what is currently considered to be the best mode for carrying out the invention.

DETAILED DESCRIPTION OF THE INVENTION

Figure 1:
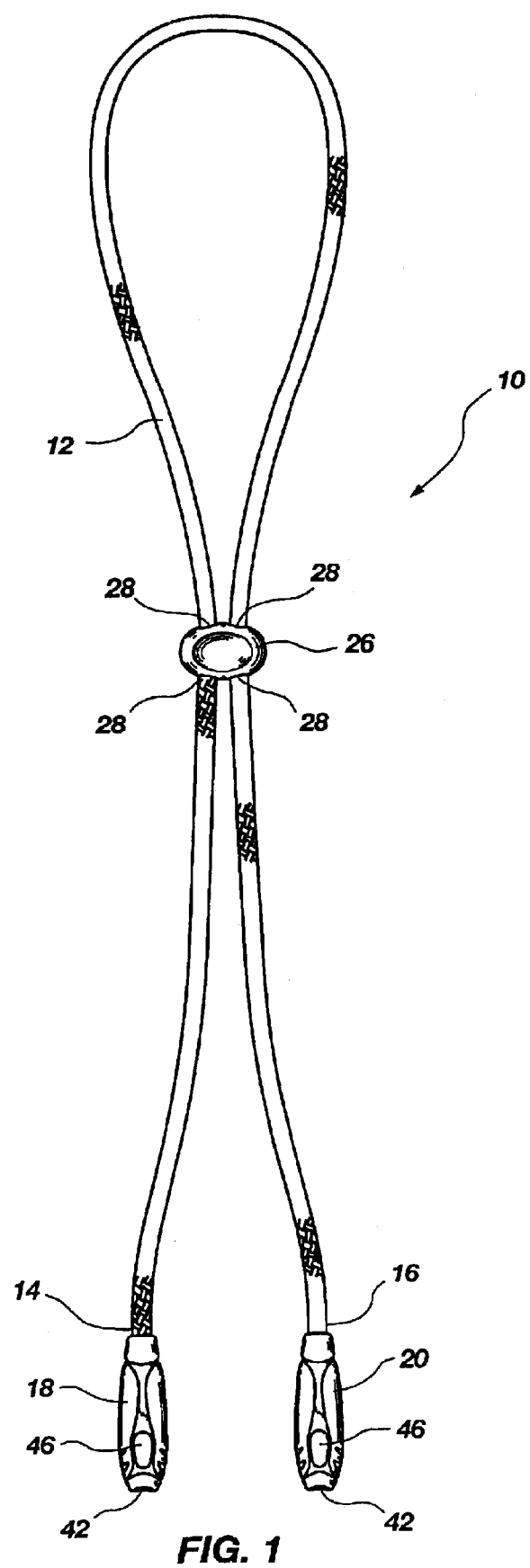
FIG. 1 is a view in elevation of the eyeglass retainer of the present invention.
Figure 2:
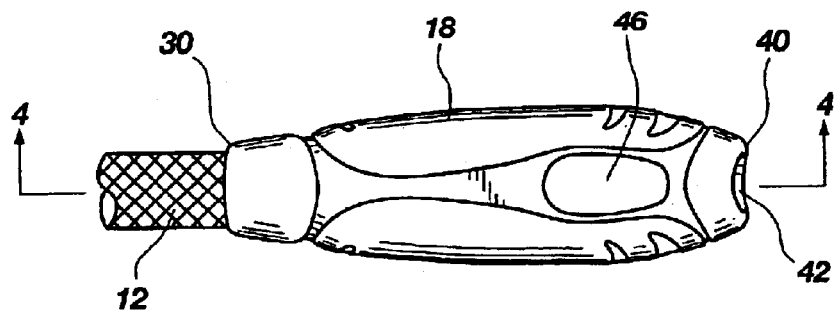
FIG. 2 is a view in elevation of one of the gripping members of the invention.
Figure 3:
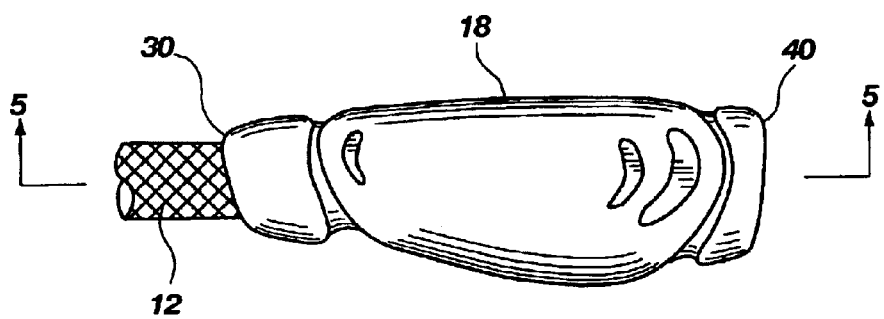
FIG. 3 is a view in elevation of the gripping member shown in FIG. 2 rotated ninety degrees on its axis.

The eyeglass retainer device 10 of the present invention, as shown in FIG. 1, generally comprises a filament member 12 having a first end 14 and a second end 16, and a first gripping member 18 attached to the first end 14 of the filament member 12 and a second gripping member 20 attached to the second end 16 of the filament member 12. The first end 14 and second end 16 of the filament member 12 define a length therebetween.

The filament member 12 may be made of any suitable material, including, but not limited to, metal, woven or non-woven fabric, woven or non-woven cord that may be either natural or synthetic, plastic or elastomeric material. The length of the filament member 12 may vary and may be selected to suit the user's size. Thus, for example, the length of the filament member 12 may be longer when used by an adult while the length of the filament member 12 used for an eyeglass retainer 10 for an infant or child is relatively shorter.

The eyeglass retainer 10 may optionally be structured with an adjustment member 26 which has one or more pair of openings 28 through which the filament member 12 may be positioned so that the adjustment member 26 may be slid along the filament member 12 to be in closer proximity or farther away from the gripping members 18, 20. When the adjustment member 26 is moved closer to the gripping members 18, 20, the glasses (not shown in FIG. 1) may be brought doser to the wearer's body, thereby securing the glasses to the face.

Figure 4:
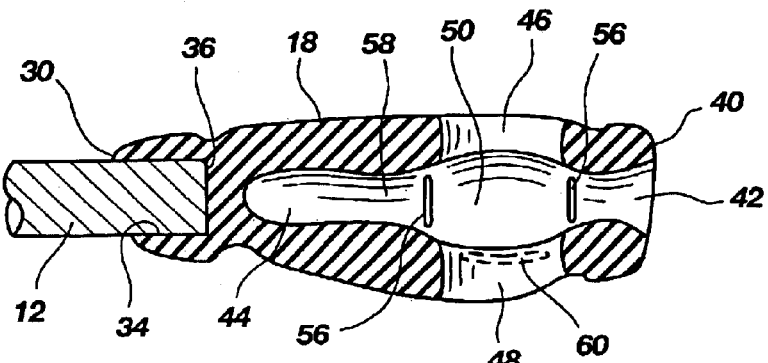
FIG. 4 is a view in cross section of the gripping member illustrated in FIG. 2 taken at line 4—4.
Figure 5:
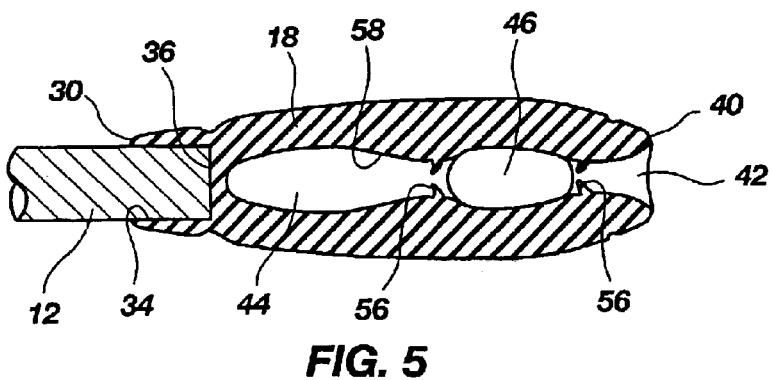
FIG. 5 is a view in cross section of the gripping member illustrated in FIG. 3 taken at line 5—5.

FIGS. 2–5 illustrate more clearly the structure of the gripping members 18, 20 of the invention. Although only one gripping member 18 is shown, it is understood that the structure of both gripping members 18, 20 is the same. Each gripping member 18 has a first end 30 which attaches to the filament member 12 in any suitable manner that secures the gripping member 18 to the filament member 12. As shown in FIGS. 4 and 5, by way of example only, the gripping member may be structured with an opening 34 sized to receive the terminal end 36 of the filament member 12. The gripping member 18 may, by way of example only, be fused to the terminal end 36 of the filament member 12.

The gripping member 18 is generally tubular, as illustrated in FIGS. 4 and 5, and has a second end 40 which has a terminal opening 42 therein. The terminal opening 42 opens into a main channel 44 which extends axially along a selected length of the gripping member 18.

Figure 12:
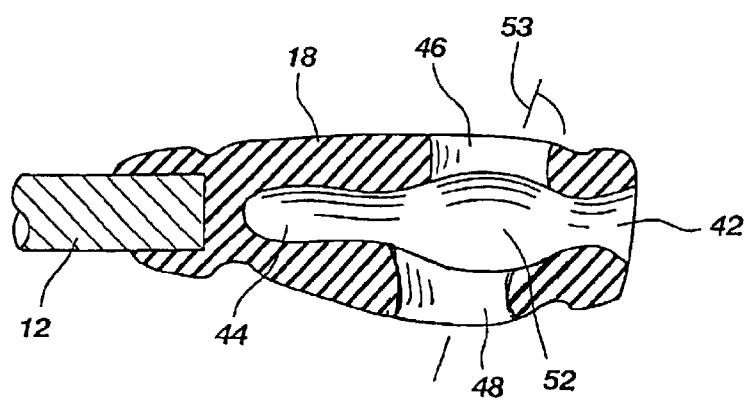
FIG. 12 is a view in cross section of an alternative embodiment of the gripping member of the present invention where the transverse openings are not aligned.

The gripping member 18 is further structured with at least one transverse opening 46 which is generally oriented normal to the terminal opening 42. In a particularly suitable embodiment, as illustrated in FIG. 4, the gripping member 18 may have a first transverse opening 46 and a second transverse opening 48 which are aligned with one another to provide a second channel 50 through which the earpiece may be positioned. In an alternative embodiment shown in FIG. 12, the two transverse openings 46, 48 may be offset from each other to provide a channel 52 the axis 53 of which is generally transverse the main channel 44, but transects the main channel 44 at an angle.

As shown in FIGS. 4 and 5, the gripping members 18 may be configured with at least one contact member 56 located to one side of the transverse openings 46, 48. In FIG. 4, two such contact members 56 are shown positioned on either side of transverse channel 50. The contact member 56 extends outwardly from the wall 58 of the main channel 44. In a particularly suitable embodiment, each contact member 56 may angle away from the terminal opening 42, as shown most clearly in FIG. 5. The contact member 56 is positioned to engage the surface of the earpiece of the glasses when inserted into the gripping member 18 to facilitate securement of the earpiece within the gripping member 18.

In an alternative embodiment, suggested in FIG. 4, the gripping member 18 may be configured with one or more transverse contact members 60 positioned adjacent the main channel 44 of the gripping member 18, one such transverse contact member 60 being shown in phantom. The transverse contact members 60 are positioned to contact and engage the earpiece of glasses when located through one or more of the transverse openings 46, 48.

Figure 6:
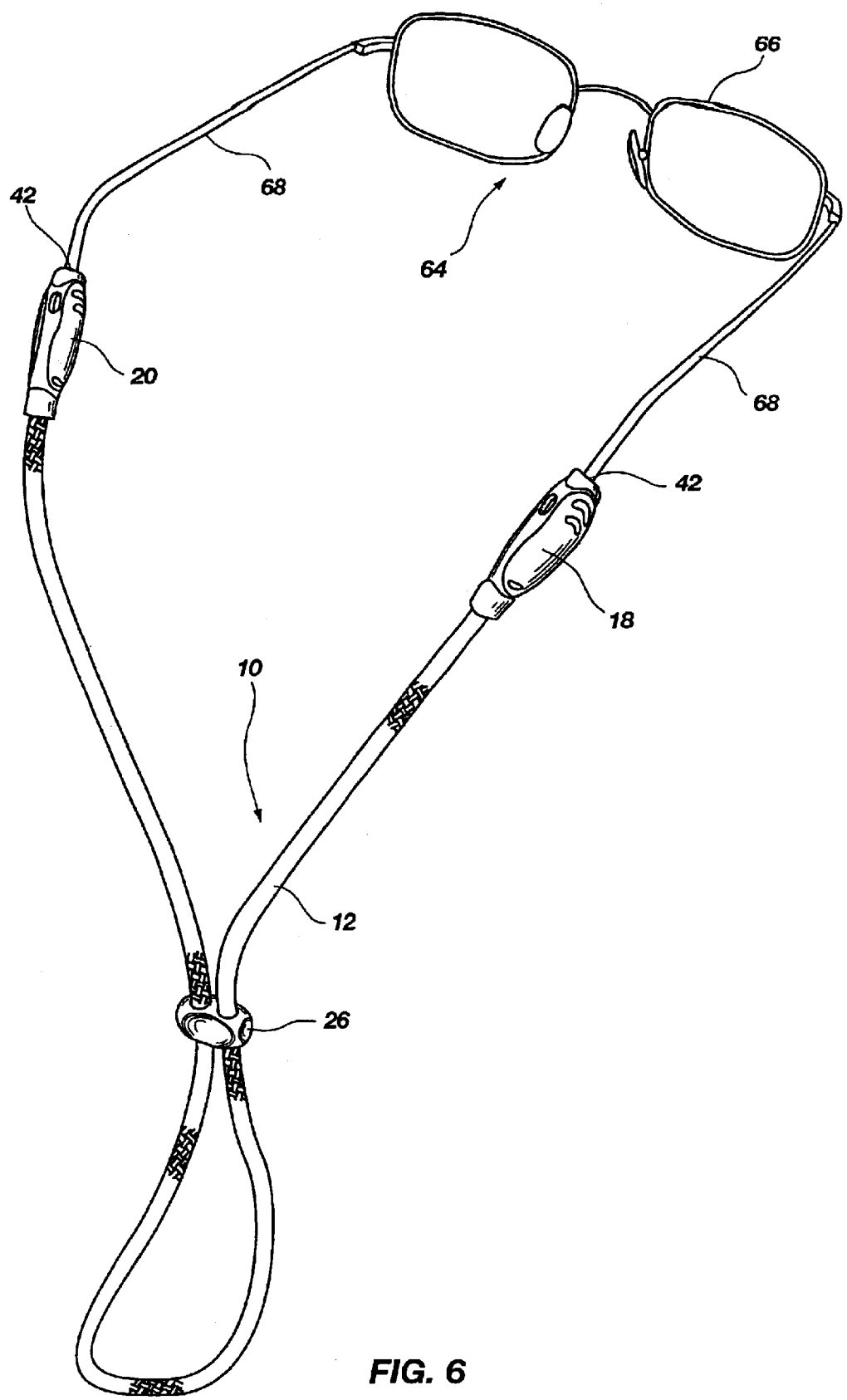
FIG. 6 is a view in perspective showing the eyeglass retainer of the present invention connected to a pair of glasses.
Figure 7:
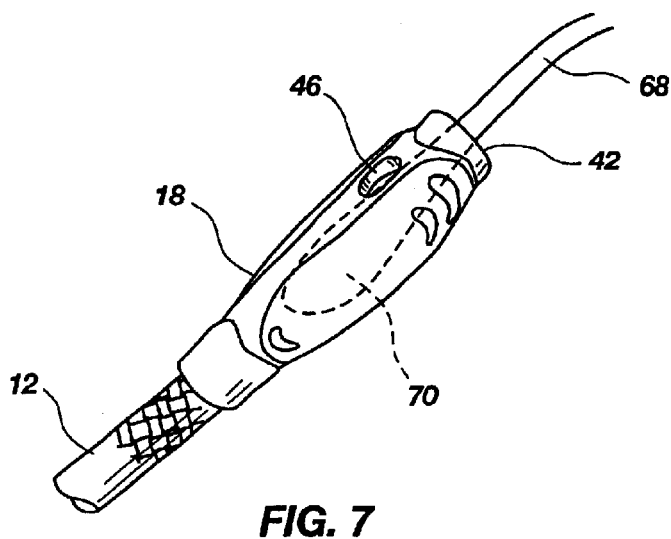
FIG. 7 is an enlarged perspective view of one of the gripping members illustrating a first mode of attaching the earpiece of glasses to the gripping member.

FIG. 6 illustrates in general how the eyeglass retainer 10 of the present invention attaches to a pair of glasses 64 having a frame 66 which includes two earpieces 68 that are provided for positioning on the wearer's ears. FIG. 6 illustrates a first means of attaching the eyeglass retainer 10 to the glasses by positioning the earpieces through the terminal opening 42 of the gripping members 18, 20. That is, as shown more clearly in FIG. 7, the terminal end 70 (shown in phantom) of the earpiece 68 may be inserted into the terminal opening 42 of the gripping member 18 to reside within the main channel 44 of the gripping member 18. Though not shown, the contact members 56, if present, keep the terminal end 70 of the earpiece 68 in place within the main channel.

Figure 8:
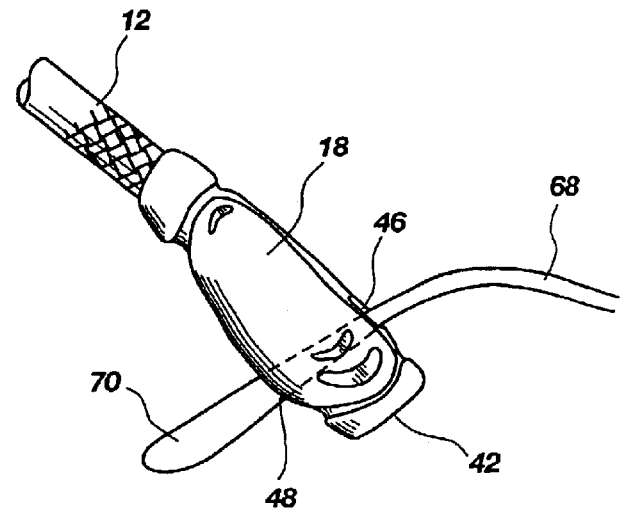
FIG. 8 is an enlarged perspective view of one of the gripping members illustrating a second mode of attaching the earpiece of glasses to the gripping member.
Figure 9:
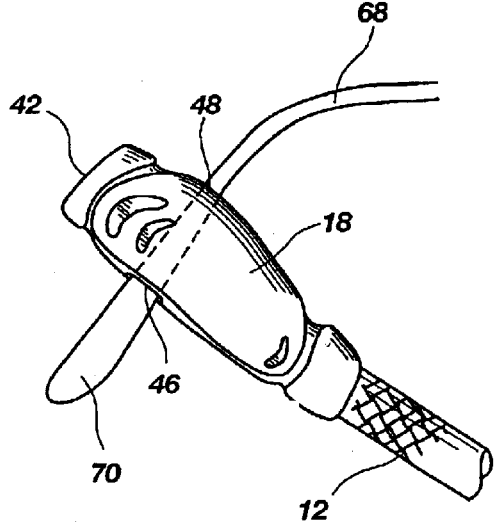
FIG. 9 is an enlarged perspective view of one of the gripping members illustrating a third mode of attaching the earpiece of glasses to the gripping member.

FIG. 8 shows an alternative means of attaching the gripping member 18 to earpiece 68 by inserting the terminal end 70 of the earpiece 68 first through the first transverse opening 46 and then through the second transverse opening 48 so that the earpiece 68 is located through the transverse channel (not seen in this view). Alternatively, as shown in FIG. 9, the terminal end 70 of the earpiece 68 may be inserted first through the second transverse opening 48 and then through the first transverse opening 46.

The positioning of the terminal end 70 through one transverse opening versus the other will effect the way the glasses hang about the user's neck and will affect the direction in which the eyeglass retainer will be oriented when the glasses are on the user's face. Personal preferences vary as to which direction the eyeglass retainer should be oriented for maximum comfort and performance of the retainer. It should also be noted that in FIGS. 8–11, the gripping member 18 is shown supported near the terminal end 70 of the earpiece 68 of the glasses. However, a user may prefer to move the gripping members along the earpiece toward the frame portion glasses. As such, the orientation of the gripping members relative to the earpiece may be other than shown, but still within the scope of the invention.

Figure 10:
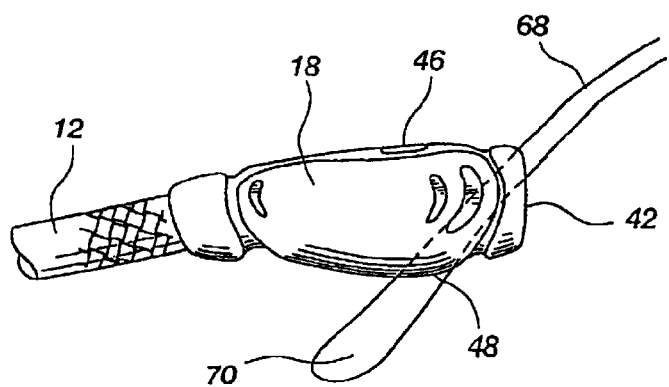
FIG. 10 is an enlarged perspective view of one of the gripping members illustrating a fourth mode of attaching the earpiece of glasses to the gripping member.
Figure 11:
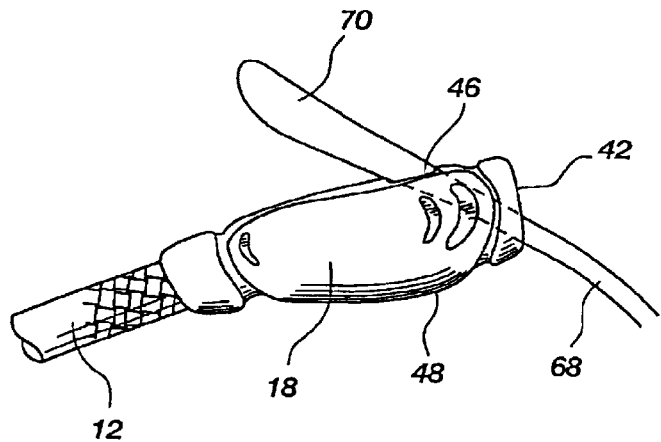
FIG. 11 is an enlarged perspective view of one of the gripping members illustrating a fifth mode of attaching the earpiece of glasses to the gripping member.

FIG. 10 illustrates yet another alternative means of attaching the gripping member 18 to the earpiece 68 of the glasses. In this embodiment, the terminal end 70 of the earpiece 68 is first positioned through the terminal opening 42 of the gripping member 18 then through the second transverse opening 48. Although not visible from this view, one or more of the contact members 56 or transverse contact member 60 may contact and engage the earpiece 68 to maintain it within the gripping member 18. Alternatively, as shown in FIG. 11, the terminal end 70 of the earpiece 68 may be positioned through the terminal opening 42 of the gripping member 18 then through the first transverse opening 46. Again, which combination of the openings through which the terminal end 70 of the earpiece is positioned will affect the way in which the eyeglass retainer is oriented relative to the glasses.

The gripping members 18, 20 of the present invention may be made of any suitable material which enables the providing of a plurality of openings through which the terminal end of the earpiece of glasses may be positioned. The gripping members 18, 20, in a particularly suitable embodiment, may be made of a flexible or elastomeric material, but any material may be suitable.

It can be seen that the eyeglass retainer of the present invention is specifically structured to provide a variety of means by which a pair of glasses may be retained by the device, thereby enabling different users to use the device of the present invention in a manner most suitable to individual preference. The eyeglass retainer of the present invention may be adapted for use with any type or form of glasses and any dimensions disclosed herein are by way of reference only. Therefore, reference herein to specific details of the eyeglass retainer of the present invention are by way of example only and not by way of limitation.

What is claimed is:

1. An eyeglass retainer, comprising:
   a filament member having a first end and a second end;
   a first gripping member having a longitudinal axis and being secured to said first end of said filament member, said first gripping member having a pair of coaxially aligned openings formed therein for receiving the terminal end of an earpiece of eyeglasses; and
   a second gripping member having a longitudinal axis and being secured to said second end of said filament member, said second gripping member having a pair of coaxially aligned openings formed therein for receiving the terminal end of an earpiece of eyeglasses.

2. The eyeglass retainer of claim 1 wherein said first gripping member and said second gripping member each has a first end secured to said filament member and a second end having a terminal opening.

3. The eyeglass retainer of claim 2 wherein said coaxially aligned openings of said first gripping member have a common axis oriented transversely to said longitudinal axis and wherein said coaxially aligned openings of said second gripping member have a common axis oriented transversely to said longitudinal axis.

4. The eyeglass retainer of claim 2 wherein said first gripping member and said second gripping member each have an axial bore extending from said second end toward said first end, said axial bore of each said gripping member having, in radial cross section, an inwardly curved wall.

5. The eyeglass retainer of claim 3 wherein said common axis of said pair of openings of each said first gripping member and said second gripping member is perpendicular to said respective longitudinal axis of each said first gripping member and said second gripping member.

6. The eyeglass retainer of claim 3 wherein said common axis of said pair of openings of each said first gripping member and said second gripping member is oriented at an angle to said respective longitudinal axis of each said first gripping member and said second gripping member.

7. The eyeglass retainer of claim 1 wherein said first gripping member and said second gripping member are each structured with at least one contact member positioned internally to each said respective gripping member to contact and retain the earpiece of eyeglasses inserted through at least one opening of each said gripping member.

8. The eyeglass retainer of claim 7 wherein said first gripping member and said second member each are formed with an axially-oriented main channel and said at least one contact member of each said first gripping member and said second gripping member is located within said axially-oriented main channel.

9. The eyeglass retainer of claim 7 wherein said first gripping member and said second member each are formed with an axially-oriented main channel and said at least one contact member of each said first gripping member and said second gripping member further includes a contact member spaced from said axially-oriented main channel.

10. An eyeglass retainer, comprising:
    a filament member having a first end and a second end;
    a first gripping member having a first end secured to said first end of said filament member and a second end having a terminal opening, said first end and said second end of said first gripping member defining an axis therebetween, and further having an axial bore and a pair of opposingly positioned openings oriented transversely to said axial bore; and
    a second gripping member having a first end secured to said second end of said filament member and a second end having a terminal opening, said first end and said second end of said second gripping member defining an axis therebetween, and further having an axial bore and a pair of opposingly positioned openings oriented transversely to said axial bore.

11. The eyeglass retainer of claim 10 wherein each said first gripping member and said second gripping member further has at least one contact member extending into said axial bore thereof and positioned to contact a portion of an eyeglass positioned through said terminal opening.

12. The eyeglass retainer of claim 10 wherein each said first gripping member and said second gripping member further comprises at least one contact member extending inwardly toward said respective axis thereof and positioned within at least one of said pair of openings of said gripping members.

13. The eyeglass retainer of claim 10 wherein each said first gripping member and said second gripping member further has at least one contact member extending inwardly toward said respective longitudinal axis thereof and positioned to contact a portion of an eyeglass positioned through said pair of opposing openings positioned respectively in said first gripping member and said second gripping member.

* * * * *